United States Patent [19]
Dayne et al.

[11] 3,829,061
[45] Aug. 13, 1974

[54] GATE VALVE SEAL

[75] Inventors: Eddy K. Dayne, Glendora; Wilbur G. Land, Anaheim, both of Calif.

[73] Assignee: Bagdad Plastics Company, Phoenix, Ariz.

[22] Filed: Sept. 20, 1971

[21] Appl. No.: 181,997

[52] U.S. Cl. ............... 251/328, 251/329, 251/368
[51] Int. Cl. ........................ F16k 3/12, F16k 27/04
[58] Field of Search ............ 251/328, 329, 327, 368

[56] References Cited
UNITED STATES PATENTS

| | | | |
|---|---|---|---|
| 1,874,405 | 8/1932 | Wood | 251/328 |
| 3,185,437 | 5/1965 | Rice | 251/329 X |
| 3,282,559 | 11/1966 | Bredtschneider | 251/327 |
| 3,316,929 | 5/1967 | Milette | 251/329 X |
| 3,429,555 | 2/1969 | Wrenshall | 251/214 |
| 3,526,386 | 9/1970 | Gachot | 251/368 X |

FOREIGN PATENTS OR APPLICATIONS

| | | | |
|---|---|---|---|
| 1,313,245 | 11/1962 | France | 251/214 |

*Primary Examiner*—Arnold Rosenthal

[57] ABSTRACT

A gate valve structure including a unitary molded plastic body with a horizontal flow passage and a vertical valve chamber intersecting the flow passage and projecting upwardly therefrom; said chamber having flat, axially spaced, substantially oppositely disposed downwardly convergent seat faces on planes transverse the axis of the flow passage to cooperatively accommodate a vertically shiftable valve gate with flat, substantially oppositely disposed, downwardly convergent sealing faces, said seat faces having annular flexible sealing face engaging sealing beads formed integrally therein, about the flow passage; said beads being of uniform major axial extent throughout their circumferential extent and having flat sealing surfaces, the upper and lower portions of which occur on planes substantially parallel with the axis of the chamber and converge downwardly and join the seat faces.

13 Claims, 8 Drawing Figures

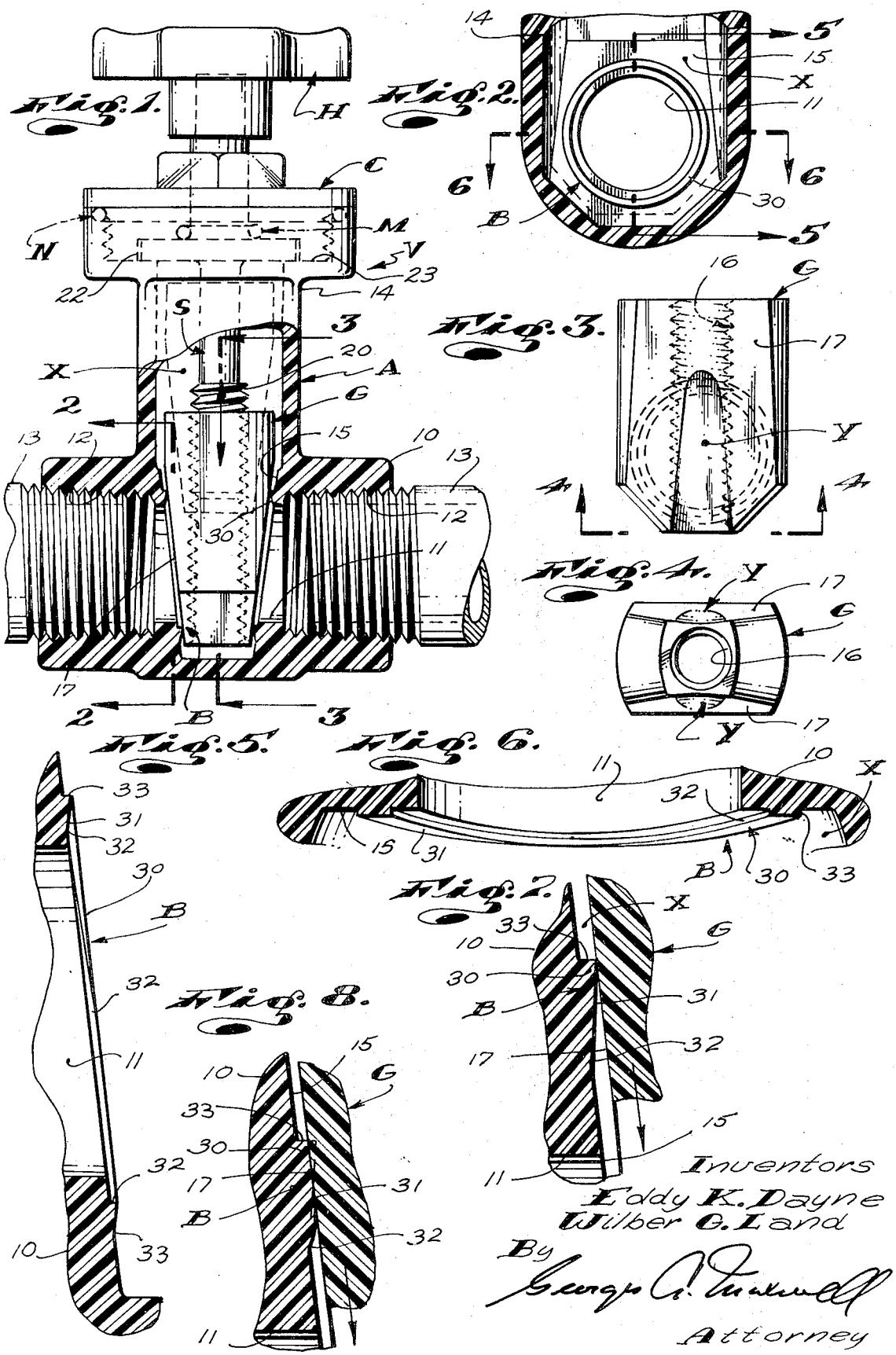

GATE VALVE SEAL

This invention has to do with a molded plastic gate valve structure and is more particularly concerned with such a structure having novel sealing means.

The ordinary gate valve structure includes an elongate body with a central longitudinal flow passage, a valve chamber in the body and intersecting the flow passage and a valving member or gate in the chamber and shiftable laterally relative to the axis of the flow passage, to and from open and closed positions where it is spaced laterally outward of the flow passage and where it intersects or extends across the flow passage and establishes a fluid tight seal in the chamber.

The portion of the chamber bisecting or intersecting the flow passage in such valves normally has or defines a pair of axially spaced substantially axially inwardly disposed, flat, laterally outwardly divergent valve seats and said valve member is a wedge shaped part with substantially axially outwardly disposed flat lateral outwardly divergent sealing faces which establish opposing seated engagement on and with the valve seats when the gate is in the closed position.

The gate and valve seats are tapered or laterally inwardly convergent as set forth above so that upon lateral inward shifting of the gate in the chamber, relative to the flow passage, it establishes tight wedging engagement with and between the valve seats.

Seldom does the gate in such a valve structure establish fluid tight sealing engagement with the seats, as the mating surfaces of said seats and sealing faces are seldom sufficiently flat and complimentary to effect the sought after seal. As a result of the foregoing, it is common practice to provide separate and special sealing means to seal between the valve seats and the gate. Such special sealing means most commonly comprise annular sealing rings of deformable sealing material carried by the seats about the flow passage and normally projecting axially inwardly from the seats and adapted to be engaged by the gate, to seal therewith when the gate is in its closed position. The sealing rings are normally engaged in ring grooves formed in the seats and are retained in the grooves by keeper rings and the like. Such special sealing means add greatly to the complexity and cost of the valve structures in which they are arranged and are not wholly effective or dependable.

Attempts have been made to establish annular sealing beads on the valve seats about the flow passages which open at said seats. In the case of metal valve structures, such beads must be machined and are both difficult and costly to establish. Still further, in the case of metal valve structures, the metal is not sufficiently resilient to establish effective or dependable sealing beads such as referred to above. In those cases where metal sealing beads have been provided, the lateral shifting of the gates into tight engagement with the beads flattens and burnishes the beads, with the result that they are rendered ineffective at an unreasonable rate.

In recent years there has been an ever increasing use of plastic materials in the establishment of valve structures. When plastics are employed the various parts of the valve structures are molded and are such that they are finished and require no grinding, machining or finishing work to be performed thereon subsequent to their being molded. The finished nature of the molded plastic parts of plastic valve structures is of paramount importance and it is that feature which makes the establishment of valves of plastic economically desirable and feasible.

In the case of plastic gate valve structures, the use of special added sealing means at the valve seats and to seal with the gates has been found to be necessary as the surface of the seats and of the sealing faces of the gates are not flat, but rather are uneven. The unevenness of the seat and sealing face surfaces of valve parts molded of plastic is the result of shrinkage and/or warping of the plastic material immediately following its being molded as it cools and cures or sets. While such shrinkage and/or warpage can be minimized by careful design and the like, it cannot practically be eliminated or controlled with sufficient certainty to mass produce valves which are such that their mating seats and sealing surfaces will dependably seal with each other.

An object and feature of our invention is to provide the valve seat surfaces of a molded plastic gate valve body with annular sealing beads in radial spaced relationship about the portions of the flow passage of the valve, opening at said surfaces.

In early attempts to provide sealing beads in molded plastic gate valve bodies, as referred to above, it was determined that such beads of sufficient size and extent to be effective could not be effectively molded in the valve bodies, since the core part of the mold which establishes the valve chamber, with its flat relatively inclined valve seat surfaces and in which the bead forming grooves must be established, could not release the beads and could not be withdrawn from the plastic parts without tearing or otherwise mutilating the beads and rendering them inoperative.

It has been found and established that the valve seat and mating sealing surfaces of gate valves such as here provided must be inclined at from 5° to 7½° to gain the desired and necessary wedging action and that the sealing beads on the valve seat surfaces must project at least 0.005 inch outward from said surfaces, to assure their proper and dependable operation in the finished valve structures. It will be noted and it is believed to be apparent that a bead projecting 0.005 inch outward from a surface of a molded plastic part, which surface is on or has a draft angle of from 5° to 7½°, establishes sufficient interfering fit or engagement with the mold to make normal withdrawal of the mold from about the bead, without damage to the bead unlikely.

It is an object and feature of our invention to provide novel sealing beads on the valve seat surfaces of a molded plastic gate valve body, the configuration of which beads is such that they are freely released by their related mold part when the valve body is molded and such that they resist and effectively withstand the lateral forces exerted thereon by the valve gate when put to use.

It is an object and feature of our invention to provide a sealing means of the character referred to wherein the annular sealing beads on the 5° to 7° pitched or inclined seat surfaces project a uniform distance from the seat surfaces about their circumferential extent and have or define flat axially disposed outer faces which are on planes at 5° to 7° from the planes of the seat surfaces, substantially normal to the axis of the flow passage in the valve body and/or substantially parallel with the mean draft angle or central axis of the valve chamber in the body.

It is an object and feature of our invention to provide a novel sealing structure of the character referred to which is easy and economical to mass-produce and a structure which is highly effective and dependable in operation.

The foregoing and other objects and features of our invention will be understood and will become apparent from the following detailed description of a typical preferred form and embodiment of our invention, throughout which description reference is made to the accompanying drawings, in which:

FIG. 1 is a side view of a valve embodying our invention with portions broken away and in sections to better illustrate details of the construction FIG. 2 is a sectional view of a portion of our structure, taken substantially as indicated by line 2—2 in FIG. 1.

FIG. 3 is a view of our valve gage, taken substantially as indicated by line 3—3 in FIG. 2.

FIG. 4 is a view taken as indicated by line 4—4 in FIG. 3; 0

FIG. 5 is an enlarged detailed sectional view taken as indicated by line 5—5 in FIG. 2;

FIG. 6 is a sectional view taken as indicated by line 6—6 in FIG. 2;

FIG. 7 is an enlarged detailed sectional view of a portion of a sealing bead as provided by this invention and showing a portion of a valve gate engaging the bead; and FIG. 8 is a view similar to FIG. 7 and showing the parts in another position.

In FIG. 1 of the drawings we have shown a typical gate valve structure V composed of molded plastic parts and embodying our invention. The valve structure V includes a body A, a gate G, a stem S, a bonnet or closure C and a hand wheel W. Each of the several above noted parts is a unitary part molded of a suitable, strong, rigid, yet resilient plastic material, such as Nylon, Teflon, or Delron.

In addition to the above, the valve structure includes a first O-ring seal M between the stem S and closure C and a second O-ring seal N between the closure C and body A.

The body A includes an elongate, horizontal lower portion 10 with a central flow passage 11 extending longitudinally therethrough and having pipe connecting means 12 at its opposite end to connect the body with related fluid conducting pipes 13. The means 12 is shown as conventional pipe thread means, which means could be substituted with any other form of connecting means without affecting the present invention.

The body A next includes an elongate, vertical, upper chest portion 14 midway between the ends of the lower portion 10 and has an upper portion which projects upwardly from the lower portion 10 of the body. The chest 14 defines an elongate, vertically extending valve chamber X with a substantially straight, vertical upper portion opening at the upper end of the chest 14 and a lower portion intersecting the flow passage 11 in the lower portion 10 of the body and defining a pair of axially spaced, substantially oppositely disposed and opposing, flat, downwardly convergent valve seat surfaces 15. The surfaces extend transverse the axis of the horizontal flow passage 11 and are inclined from 5° to 7½° from vertical.

The gate G is a simple unitary molded plastic block-like part with a central, vertical, threaded stem receiving opening 16 and has a pair of substantially flat, axially spaced, substantially oppositely disposed downwardly convergent sealing surfaces 17. The surfaces 17 occur on planes extending transverse the axis of the flow passage 11 and parallel with the planes of the seal faces 15 in the body.

The sealing surfaces 17 of the gate G, due to variations in wall thickness and resulting variations in the quench or cooling rate of the material of which the gate is molded, immediately following molding, are not flat and even. In the case illustrated and as shown in FIGS. 3 and 4 of the drawings, the wall thickness of the portions of the gate defining the surfaces 17 and adjacent the opening 16 therein, are thin and become progressively thinner as the surfaces 17 converge downwardly toward the axis of the opening 16. As a result of the above noted thinning of the wall thickness of the gate, the thinning portions cool, cure and/or set more rapidly than the remainder of the gate, shrink to a greater extent than the remainder of the gate and establish or create slight indentation-like irregularities or depressions in the surfaces 17, as indicated at Y. The depressions Y in the surfaces 17 of the gate G are common in gates of the nature and class here provided and are typical and/or illustrative of the nature of irregularities which are normally to be found in molded plastic parts.

The irregularities or depressions Y are generally effectively controlled so that they are no greater or deeper than for example 0.002 inch or 0.003 inch from the surfaces 17.

The stem S is an elongate, vertical unitary molded plastic part arranged centrally of the chamber X, with a lower threaded portion 20 terminating in the chamber adjacent the upper most plane of the flow passage 11 and threaded in the opening 16 in the gate G, a central portion 21 extending through the chamber X and having a thrust flange 22 thereon to engage an upwardly disposed bearing surface established in the chest 14 and an upper portion 23 projecting upwardly through the closure or cap C.

The cap C is a unitary molded plastic part screw threaded in the upper end of the chest to close the top of the chamber, has a central opening through which the portion 22 of the stem projects and defines a downwardly disposed surface engageable with the thrust flange.

The hand wheel H is a unitary molded plastic part suitably fixed to the upper terminal end of the stem.

The seal M is a simple O-ring seal about the upper portion of the stem to occur between and seal with the thrust flange and the cap.

The seal N is a simple O-ring seal about the upper threaded portion of the cap C and engaged with the upper end portion of the chest 14 of the body A.

The structure thus far described is a type of gate valve structure, the function and operation of which s apparent and well-known in the art of valves and is but one style or design of gate valve structure in and with which our invention can be advantageously embodied.

The instant invention is concerned or has to do with the provisions of novel sealing means B to establish fluid tight seals between the sealing surfaces of a valving gate, such as the surfaces 17 of the gate G, and the valve seat surfaces of a valve body and which oppose the surfaces 17; and as the seat 15 of the body A.

The sealing means B includes annular sealing beads 30 of novel configuration and established of resilient plastic, formed integrally on the valve seat faces 15 of the molded plastic valve body A, said beads 30 being formed on the seat faces 15, simultaneously with molding of the body A.

The beads 30 of the sealing means B project axially from the upwardly and axially outwardly inclined seat surfaces 15 a uniform extent or distance about their circumferential extent, for example, they project 0.005 inch from the surfaces 15. The beads are spaced radially outward of the portions of the flow passage 11 which are related to and open at the surfaces 15 and with which the beads are related.

Each bead 30 is unique and distinguishes from other known sealing beads in like environments in that it has a flat, axially inwardly disposed sealing face 31 which face is substantially parallel with the vertical axis of the chamber X in the body and normal to the axis of the lower portion 10 of the body and the flow passage 11. With the above relationship of parts or portions, the bead 31 is rectangular in cross-section on its central horizontal axis, as shown in FIG. 6 of the drawings and is V-shaped or wedge-shaped in cross-section on its central vertical axis, as shown in FIGS. 5 and 8 of the drawings.

Still further, the upper and lower portions of the sealing face 31, at the central vertical axis of the bead, converge downwardly relative to and join or intersect the seat surface 15 and in such a manner that no downwardly disposed edges or shoulders occur on the bead at and adjacent to its central vertical axis and so that the inside or interior of the upper quadrants and outside or exterior of the lower quadrants of the bead have or define edges 32 and 33 which are parallel with the axis of the flow passage and which progressively diminishes in axial extent as they extend from the horizontal to the vertical axis of the bead and as said edges turn and advance from a vertical plane at the horizontal axis of the bead to a horizontal plane at the vertical axis of the bead.

With the sealing bead configuration set forth above, it will be apparent that when the sealing face 17 of the gate G moved downwardly in the valve chamber X and into engagement with the bead 30, th face 17 initially establishes uninterrupted contact with the bead about the entire circumferential extent thereof. Subsequent to the establishment of initial contact and upon further downward shifting of the gate G, the increased forces exerted between the bead and the gate are resolved downwardly and axially outwardly onto and through the bead.

Such forces tend to move the material of the bead downwardly and axially outwardly relative to its related face 15 and in such a manner that tends to shear the bead from its related face 15 or to bend and/or roll it downwardly relative to the said face 15.

The tendency of the applied forces to shear, bend and/or roll the bead is greatest at the top and bottom extremities of the bead where the bead extends horizontally and intersects the central longitudinal vertical plane of the construction. As the bead extends circumferentially from a horizontal to a vertical disposition within the structure, the shearing, bending and/or rolling effect of the applied force diminishes at a rapid rate. The above is due to the fact that the vertically disposed or side portions of the bead are self-supporting with respect to the applied force, presenting considerable of their cross-sectional extent thereto, while the horizontally disposed top and bottom portions of the bead present a minimum of cross-section to the applied force and are substantially unsupported.

With the above noted, unique, downwardly convergent V-shaped or wedge-shaped configurations of the horizontal top and bottom portions of the sealing bead that we provide, the noted portions of the bead are such that they effectively resist shearing, downward bending and/or rolling when engaged by the gate and are subjected to the noted downward and axially resolved forces.

In addition to the above noted sealing function and characteristics of our new sealing bead structure, the sealing beads are such that at no place is there presented a downwardly disposed shoulder or ledge about the perimeter of the beads to interfere with or prevent pulling, or extraction of a male mold element or part employed to establish the beads, their related seat faces and the chamber of the molded valve body.

While both radially inwardly and outwardly disposed inner and outer edges 32 and 33 occur at the opposite sides of the bead, the upper portions of the inner edge 32 diminish progressively as they extend upwardly from each side of the bead toward the top center thereof and the lower portions of the outer edge 33 diminish progressively as they extend downwardly from each side of the bead and toward the bottom center thereof.

With the above relationship of parts, the radially inwardly and downwardly disposed portions of the edge 32 and the radially outwardly and downwardly disposed portions of the edge 33 of the two beads in the valve body become progressively less in axial extent as they approach the central vertical axis of beads and fare into the surfaces 15 adjacent the central vertical axis of the beads. Accordingly, as the disposition of the noted portions of the bead edges change from vertical to horizontal, they diminish in axial extent. As a result of the foregoing, when the male mold part of the molding means is extracted vertically from within the valve body, the beads are at no point subjected to direct shear, but rather, are only rolled slightly and gently by the male part and in such a manner that no damage to the beads occurs and extraction of said mold part is accomplished with ease.

With the above noted novel sealing bead construction it is possible to establish effective sealing beads on the opposing convergent seat faces in a unitary molded plastic gate valve body, using standard or conventional molding techniques and procedures.

Having described only typical preferred forms and applications of my invention, I do not wish to be limited or restricted to the specific details herein set forth, but wish to reserve to myself any modifications and/or variations that may appear to those skilled in the art.

Having described our invention, we claim:

1. A gate valve, of homogeneous plastic material for controlling the flow of fluid, having an inlet and an outlet; a central chamber disposed intermediate the inlet and outlet, and a wedge-shaped member having opposed planar convergent faces and being selectively positionable witin the central chamber, said gate valve comprising:

a. a first planar surface disposed within the central chamber parallel to one of said faces of said wedge-shaped member, said first planar surface having an inlet orifice disposed therein and communicating with the inlet;

b. a second planar surface disposed within the central chamber parallel to another of said faces of said wedge-shaped member, said second planar surface having an outlet orifice disposed therein and communicating with the outlet;

c. a resilient deformable annular inlet protrusion disposed about said inlet orifice, said inlet protrusion being formed as an integral part of said first planar surface, said inlet protrusion tapering in cross-sectional area to a point of substantially zero area;

d. a resilient deformable annular outlet protrusion disposed about said outlet orifice, said outlet protrusion being formed as an integral part of said second planar surface, said outlet protrusion tapering in cross-sectional area to a point of substantially zero area; and e. means for positioning said wedge-shaped member into and out of contact with said inlet and said outlet protrusions; whereby, said wedge-shaped member, when in one position, compresses said inlet and said outlet protrusion to seal the inlet and the outlet and inhibits a flow of fluid therebetween, and, when in another position, permits a flow of fluid between the inlet and outlet.

2. The gate valve as set forth in claim 1 wherein said positioning means comprises:
a. a rotatable threaded stem;
b. a threaded cavity disposed within said wedge-shaped member for receiving said threaded stem;
c. guide means disposed within said gate valve to inhibit rotation of said wedge-shaped member; and
d. means for rotating said stem; whereby, rotation of said stem causes said wedge-shaped member to be axially displaced along said stem.

3. The gate valve as set forth in claim 2 wherein said gate valve includes:
a. a first load bearing surface;
b. a second load bearing surface; and
c. a thrust flange secured to said stem and positioned intermediate said first and second load bearing surfaces; whereby axial movement of said stem is inhibited.

4. The gate valve as set forth in claim 3 wherein said second load bearing surface comprises a cap threadedly engaging the body of said gate valve, said cap including an aperture disposed therein for receiving said stem.

5. The gate valve as set forth in claim 4 including first sealing means disposed intermediate said cap and said thrust flange for preventing a flow of fluid through said cap along said stem.

6. The gate valve as set forth in claim 5 further including second sealing means disposed intermediate said cap and said body for preventing a flow of fluid intermediate said body and said cap.

7. A gate valve for controlling the flow of fluid between an inlet port and an outlet port, said gate valve comprising:
a. a positionable wedge shaped member having opposed convergent planar faces;
b. a first planar surface defining the interior extension of said inlet port, said first surface being parallel to one of said faces of said member;
c. a second planar surface defining the interior extension of said outlet port, said second surface being parallel to another of said faces of said member;
d. a first resilient deformable annular protrusion disposed about said inlet port, said first annular protrusion being integral with said first planar surface and extending therefrom, said first annular protrusion tapering in cross-sectional area to a point of substantially zero area;
e. a second resilient deformable annular protrusion disposed about said outlet port, said second annular protrusion being integral with said second planar surface and extending therefrom, said second annular protrusion tapering in cross-sectional area to a point of substantially zero area;
f. positioning means for placing the opposed faces of said member in contact with corresponding annular protrusions disposed about said inlet and outlet ports; whereby, the opposed faces tend to compress said annular protrusions and effect a closure of said inlet and said outlet ports to prevent fluid flow therebetween.

8. The gate valve as set forth in claim 7 wherein each of said annular protrusions and the associated one of each said first and the second planar surfaces are co-formed of a generally homogeneous plastic material.

9. The gate valve as set forth in claim 8 wherein each of said annular protrusions and said member are of similar generally homogeneous plastic material.

10. The gate valve as set forth in claim 7 wherein the cross section of each of said annular protrusions diminishes in width with increased distance from the corresponding planar surface.

11. The gate valve as set forth in claim 10 wherein the cross sectional configuration of each of said annular protrusions is uniform.

12. The gate valve as set forth in claim 10 wherein the cross sectional area of each of said annular protrusions is uniform.

13. The gate valve as set forth in claim 7 wherein each of said first and second annular protrusions are V-shaped in cross-section.

* * * * *